(12) United States Patent
Andison et al.

(10) Patent No.: US 8,573,964 B2
(45) Date of Patent: Nov. 5, 2013

(54) LIQUID OR HYDRAULIC BLOW MOLDING

(75) Inventors: David Andison, Oakville (CA); George David Lisch, Jackson, MI (US); Kirk Edward Maki, Tecumseh, MI (US); Theodore F. Eberle, Ann Arbor, MI (US); James R. Corn, Jr., Columbia, SC (US); Robert A. Cooper, Grass Lake, MI (US); Terry D. Patcheak, Ypsilanti, MI (US)

(73) Assignee: Amcor Limited, Hawthorn (AU)

( * ) Notice: Subject to any disclaimer, the term of this patent is extended or adjusted under 35 U.S.C. 154(b) by 168 days.

(21) Appl. No.: 12/906,275

(22) Filed: Oct. 18, 2010

(65) Prior Publication Data

US 2011/0135778 A1    Jun. 9, 2011

Related U.S. Application Data

(60) Continuation-in-part of application No. 12/701,925, filed on Feb. 8, 2010, which is a division of application No. 11/786,736, filed on Apr. 12, 2007, now Pat. No. 7,914,726.

(60) Provisional application No. 60/791,954, filed on Apr. 13, 2006.

(51) Int. Cl.
B29C 49/58    (2006.01)

(52) U.S. Cl.
USPC .......................................................... 425/524

(58) Field of Classification Search
USPC .................. 425/524; 264/529, 570
See application file for complete search history.

(56) References Cited

U.S. PATENT DOCUMENTS

| 3,267,185 A | 8/1966 | Freeman, Jr. |
| 3,268,635 A | 8/1966 | Kraus et al. |
| 3,993,427 A | 11/1976 | Kauffman et al. |
| 4,039,641 A | 8/1977 | Collins |
| 4,177,239 A | 12/1979 | Gittner et al. |

(Continued)

FOREIGN PATENT DOCUMENTS

| EP | 0379264 | 7/1990 |
| EP | 0445465 | 11/1991 |

(Continued)

OTHER PUBLICATIONS

International Search Report and Written Opinion dated May 30, 2012 in corresponding International Patent Application No. PCT/US2011/056057 (six pages).

(Continued)

*Primary Examiner* — Robert B Davis
(74) *Attorney, Agent, or Firm* — Harness, Dickey & Pierce, P.L.C.

(57) ABSTRACT

An apparatus and method for simultaneously forming and filling a plastic container is provided. A mold cavity defines an internal surface and is adapted to accept a preform. A pressure source is a servo motor system that includes an inlet. The servo motor system is operable to draw liquid through the inlet and urge it into the preform. A blow nozzle may be adapted to receive the liquid from the pressure source and transfer the liquid at high pressure into the preform thereby urging the preform to expand toward the internal surface of the mold cavity and create a resultant container. The liquid remains within the container as an end product.

23 Claims, 5 Drawing Sheets

(56) References Cited

U.S. PATENT DOCUMENTS

| | | | |
|---|---|---|---|
| 4,321,938 A | 3/1982 | Siller | |
| 4,432,720 A | 2/1984 | Wiatt et al. | |
| 4,490,327 A | 12/1984 | Calvert et al. | |
| 4,499,045 A | 2/1985 | Obsomer | |
| 4,539,172 A | 9/1985 | Winchell et al. | |
| 4,883,631 A | 11/1989 | Ajmera | |
| 4,935,190 A | 6/1990 | Tennerstedt | |
| 4,952,134 A | 8/1990 | Bartley et al. | |
| 5,129,815 A | 7/1992 | Miyazawa et al. | |
| 5,269,672 A | 12/1993 | DiGangi, Jr. | |
| 5,344,596 A | 9/1994 | Hendry | |
| 5,389,332 A | 2/1995 | Amari et al. | |
| 5,403,538 A | 4/1995 | Maeda | |
| 5,486,103 A | 1/1996 | Meiring et al. | |
| 5,540,879 A | 7/1996 | Orimoto et al. | |
| 5,622,735 A | 4/1997 | Krishnakumar et al. | |
| 5,687,550 A | 11/1997 | Hansen et al. | |
| 5,824,237 A | 10/1998 | Stumpf et al. | |
| 5,962,039 A | 10/1999 | Katou et al. | |
| 6,214,282 B1 | 4/2001 | Katou et al. | |
| 6,277,321 B1 | 8/2001 | Vailliencourt et al. | |
| 6,485,670 B1 | 11/2002 | Boyd et al. | |
| 6,502,369 B1 | 1/2003 | Andison et al. | |
| 6,692,684 B1 | 2/2004 | Nantin et al. | |
| 6,729,868 B1 | 5/2004 | Vogel et al. | |
| 6,749,415 B2 | 6/2004 | Boyd et al. | |
| 6,767,197 B2 | 7/2004 | Boyd et al. | |
| 7,141,190 B2 | 11/2006 | Hekal | |
| 7,473,388 B2 | 1/2009 | Desanaux et al. | |
| 7,553,441 B2 | 6/2009 | Shi | |
| 7,658,882 B2 | 2/2010 | Minganti | |
| 7,914,726 B2 | 3/2011 | Andison et al. | |
| 7,981,356 B2 | 7/2011 | Warner et al. | |
| 8,017,064 B2 | 9/2011 | Andison et al. | |
| 8,096,483 B2 | 1/2012 | Riney | |
| 2001/0010145 A1 | 8/2001 | Tawa et al. | |
| 2004/0070119 A1 | 4/2004 | Fibbia et al. | |
| 2005/0067002 A1 | 3/2005 | Jones | |
| 2005/0098527 A1 | 5/2005 | Yates, III | |
| 2005/0206045 A1 | 9/2005 | Desanaux et al. | |
| 2006/0097417 A1 | 5/2006 | Emmer | |
| 2006/0231646 A1 | 10/2006 | Geary, Jr. | |
| 2008/0271812 A1 | 11/2008 | Stefanello et al. | |
| 2010/0084493 A1 | 4/2010 | Troudt | |
| 2010/0303946 A1 | 12/2010 | Voth | |
| 2011/0265433 A1 | 11/2011 | Chauvin et al. | |

FOREIGN PATENT DOCUMENTS

| | | |
|---|---|---|
| EP | 0849514 | 6/1998 |
| EP | 1529620 | 5/2005 |
| EP | 1577258 | 9/2005 |
| EP | 1688234 | 8/2006 |
| FR | 2887525 | 12/2006 |
| JP | 57123027 | 7/1982 |
| JP | 63-249616 | 10/1988 |
| JP | 08197563 A * | 8/1996 |
| JP | 09057834 | 3/1997 |
| JP | 09099477 | 4/1997 |
| JP | 10-217258 | 8/1998 |
| JP | 2000-043129 | 2/2000 |
| JP | 2000-167195 | 6/2000 |
| JP | 2002-067131 | 3/2002 |
| JP | 2003-053823 | 2/2003 |
| JP | 2005-067002 | 3/2005 |
| JP | 2005-254704 | 9/2005 |
| JP | 2009-045876 | 3/2009 |
| JP | 2005-529002 | 9/2009 |
| KR | 10-0147442 | 8/1998 |
| KR | 2006-0105883 | 10/2006 |
| KR | 10-2006-0128062 | 12/2006 |
| WO | WO 02/24435 | 3/2002 |
| WO | WO 03/095179 | 11/2003 |
| WO | WO2004/065105 | 8/2004 |
| WO | WO 2005/044540 | 5/2005 |
| WO | WO2007/120807 | 10/2007 |

OTHER PUBLICATIONS

International Search Report and Written Opinion dated Jun. 15, 2012 in corresponding International Patent Application No. PCT/US2011/051293 (eight pages).

International Search Report and Written Opinion dated Apr. 17, 2012 in corresponding PCT International Patent Application No. PCT/US2011/051284 (nine pages).

International Search Report and Written Opinion dated Apr. 18, 2012 in corresponding PCT International Patent Application No. PCT/US2011/051289 (nine pages).

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated Sep. 28, 2012 in corresponding International Patent Application No. PCT/US2012/024954 (six pages).

International Search Report and Written Opinion dated Oct. 29, 2012 in corresponding International Patent Application No. PCT/US2012/024950 (seven pages).

* cited by examiner

LIQUID OR HYDRAULIC BLOW MOLDING

CROSS-REFERENCE TO RELATED APPLICATIONS

This application is a continuation-in-part of U.S. patent application Ser. No. 12/701,925, which was filed on Feb. 8, 2010. U.S. patent application Ser. No. 12/701,925 is a divisional of U.S. patent application Ser. No. 11/786,736, which was filed on Apr. 12, 2007, which claims the benefit of U.S. Provisional Application No. 60/791,954, which was filed on Apr. 13, 2006. The entire disclosures of each of the above applications are incorporated herein by reference.

FIELD

This disclosure generally relates to an apparatus and method for forming and filling a plastic container. More specifically, this disclosure relates to an apparatus and method for simultaneously forming and filling a plastic container.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc). Once a container has been blown, a commodity may be filled into the container.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, there is a need for a liquid or hydraulic blow molding system suitable for forming and filling a container in a single operation.

SUMMARY

This section provides a general summary of the disclosure, and is not a comprehensive disclosure of its full scope or all of its features.

Accordingly, the present disclosure provides a system and method for using the final liquid product to impart the pressure required to expand a hot preform and to take on the shape of a mold thus simultaneously forming and filling the container.

In one example, the system includes a mold cavity defining an internal surface and adapted to accept a preform. The system also includes a pressure source having an inlet, a filling cylinder and a piston-like device. The piston-like device is moveable within the filling cylinder in a first direction such that liquid is drawn into the filling cylinder through the inlet and in a second direction such that the liquid is urged toward the preform. A blow nozzle may be adapted to receive the liquid from the pressure source and transfer the liquid at high pressure into the preform thereby urging the preform to expand toward the internal surface of the mold cavity and create a resultant container. The liquid remains within the container as an end commodity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
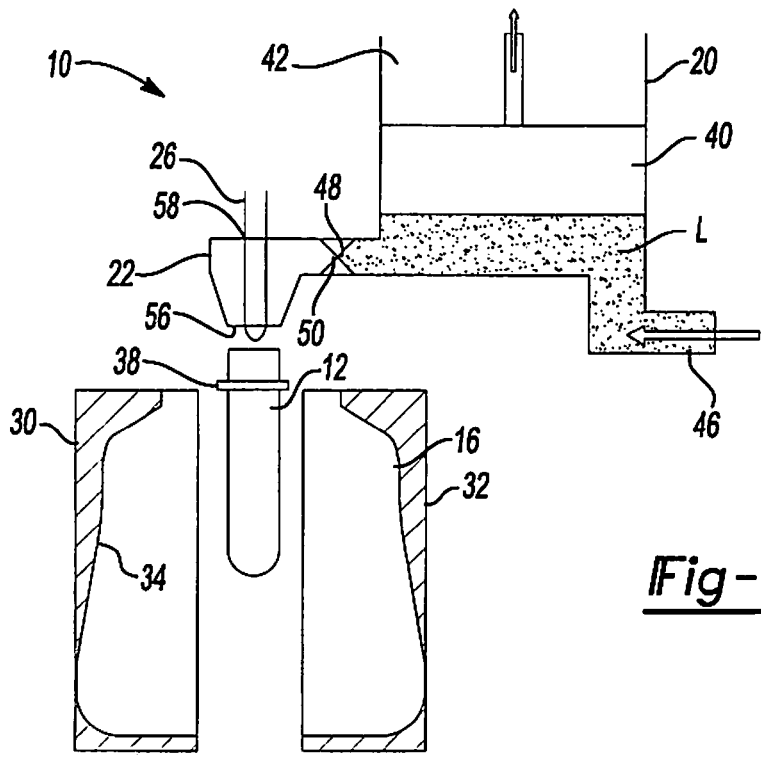
FIG. 1 is a schematic depiction of a heated preform passed into a mold station wherein a pressure source including a piston-like device begins to move upward, drawing liquid into the pressure source in accordance with the teachings of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 6:
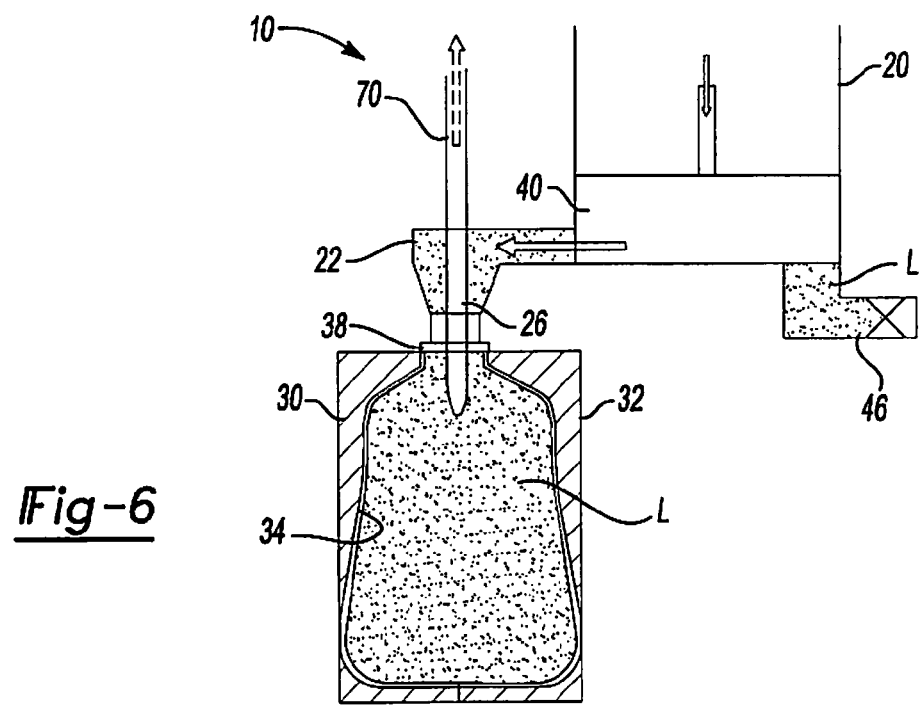
FIG. 6 is a schematic depiction of the system of FIG. 5 wherein the piston-like device has been fully actuated thereby completely transferring an appropriate volume of liquid to the newly formed container and wherein the stretch rod is withdrawing.
Figure 7:
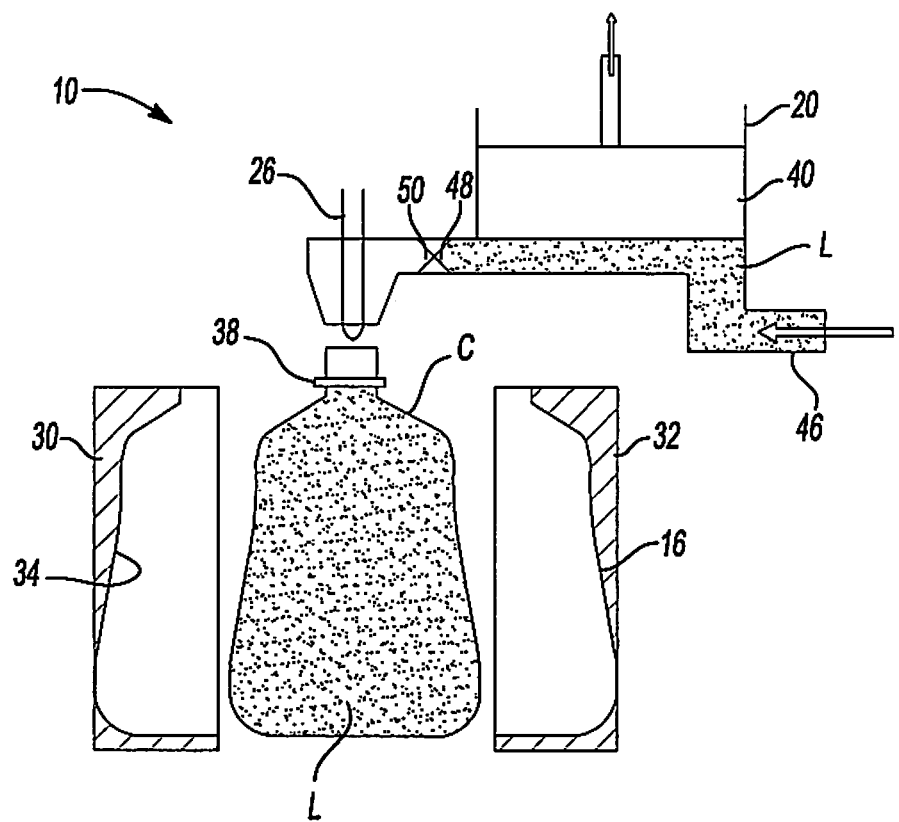
FIG. 7 is a schematic depiction of the system of FIG. 6 wherein the mold halves separate and the piston-like device begins to draw liquid into the pressure source in preparation for the next cycle.
Figure 8:
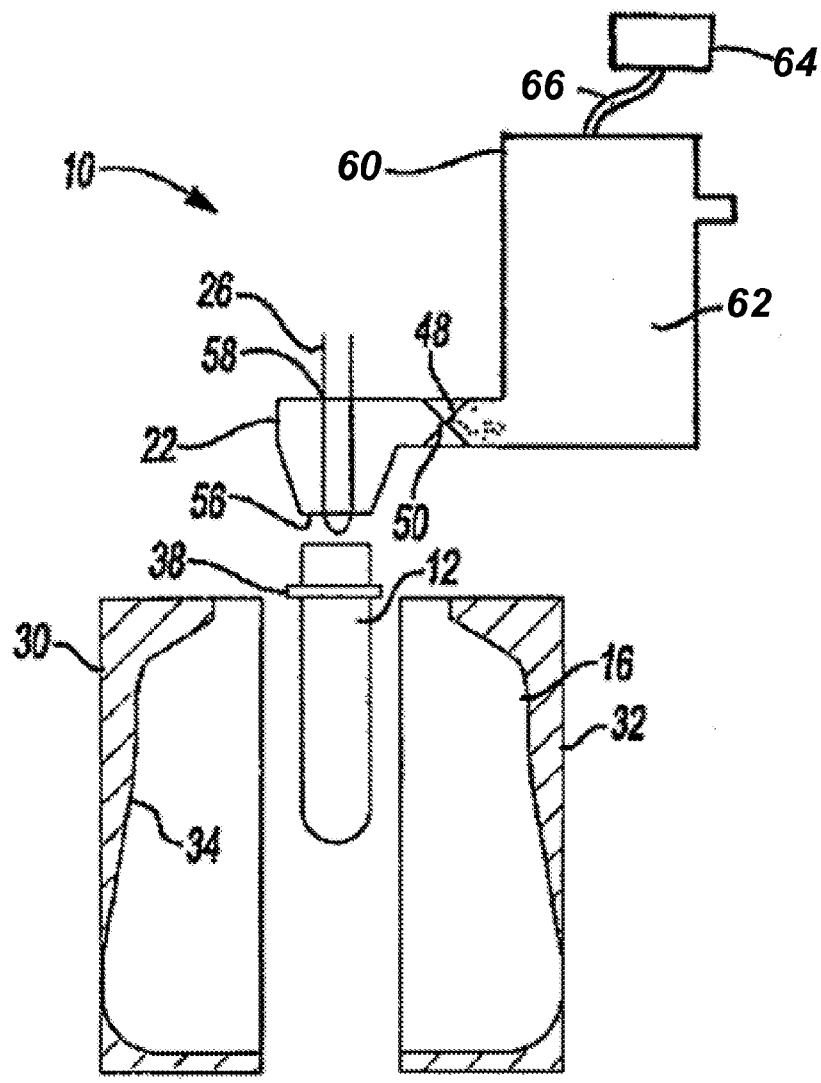
FIG. 8 is a schematic depiction of a heated preform passed into a mold station wherein a pressure source including a servo motor system in accordance with the teachings of the present disclosure.

With reference to all Figures, a mold station according to the present teachings is shown and generally referred to as reference numeral 10. FIGS. 1-7 show one exemplary sequence according to the present teachings. As will become appreciated from the following description, the mold station 10 and associated method utilize a final liquid commodity L to impart the pressure required to expand a hot preform 12 to take on the shape of a mold thus simultaneously forming and filling the resultant container C (FIG. 7).

With initial reference to FIG. 1, the mold station 10 will be described in greater detail. The mold station 10 generally includes a mold cavity 16, a pressure source 20, a blow nozzle 22 and a stretch rod 26. The exemplary mold cavity 16 illustrated includes mold halves 30, 32 that cooperate to define an interior surface 34 corresponding to a desired outer profile of a blown container. The mold cavity 16 may be moveable from an open position (FIG. 1) to a closed position (FIG. 2) such that a support ring 38 of the preform 12 is captured at an upper end of the mold cavity 16. The preform 12 may be formed of a polyester material, such as polyethylene terephthalate (PET), having a shape well known to those skilled in the art similar to a test-tube with a generally cylindrical cross section and a length typically approximately fifty percent (50%) that of the resultant container C height. The support ring 38 may be used to carry or orient the preform 12 through and at various stages of manufacture. For example, the preform 12 may be carried by the support ring 38, the support ring 38 may be used to aid in positioning the preform 12 in the mold cavity 16, or an end consumer may use the support ring 38 to carry the plastic container C once manufactured.

In one example, the pressure source 20 can be in the form of, but not limited to, a filling cylinder, manifold or chamber 42 that generally includes a mechanical piston-like device 40 including, but not limited to, a piston, a pump (such as a hydraulic pump) or any other such similarly suitable device, moveable within the filling cylinder, manifold or chamber 42. The pressure source 20 has an inlet 46 for accepting liquid commodity L and an outlet 48 for delivering the liquid commodity L to the blow nozzle 22. It is appreciated that the inlet 46 and the outlet 48 may have valves incorporated thereat. The piston-like device 40 may be moveable in a first direction (upward as viewed in the FIGS.) to draw liquid commodity L from the inlet 46 into the filling cylinder, manifold or chamber 42, and in a second direction (downward as viewed in the FIGS.) to deliver the liquid commodity L from the filling cylinder, manifold or chamber 42 to the blow nozzle 22. The piston-like device 40 can be moveable by any suitable method such as pneumatically, mechanically or hydraulically for example. The inlet 46 of the pressure source 20 may be connected, such as by tubing or piping to a reservoir or container (not shown) which contains the final liquid commodity L. It is appreciated that the pressure source 20 may be configured differently.

The blow nozzle 22 generally defines an inlet 50 for accepting the liquid commodity L from the outlet 48 of the pressure source 20 and an outlet 56 (FIG. 1) for delivering the liquid commodity L into the preform 12. It is appreciated that the outlet 56 may define a shape complementary to the preform 12 near the support ring 38 such that the blow nozzle 22 may easily mate with the preform 12 during the forming/filling process. In one example, the blow nozzle 22 may define an opening 58 for slidably accepting the stretch rod 26 used to initiate mechanical stretching of the preform 12.

In one example, the liquid commodity L may be introduced into the plastic container C during a thermal process, typically a hot-fill process. For hot-fill bottling applications, bottles generally fill the plastic container C with a liquid or product at an elevated temperature between approximately 185° F. to 205° F. (approximately 85° C. to 96° C.) and seal the plastic container C with a closure (not illustrated) before cooling. In one configuration, the liquid may be continuously circulated within the filling cylinder, manifold or chamber 42 through the inlet 46 whereby the liquid can be heated to a preset temperature (i.e., at a heat source (not illustrated) upstream of the inlet 46). In addition, the plastic container C may be suitable for other high-temperature pasteurization or retort filling processes, or other thermal processes as well. In another example, the liquid commodity L may be introduced into the plastic container C under ambient or cold temperatures. Accordingly, by way of example, the plastic container C may be filled at ambient or cold temperatures such as between approximately 32° F. to 90° F. (approximately 0° C. to 32° C.), and more preferably at approximately 40° F. (approximately 4.4° C.).

Figure 2:
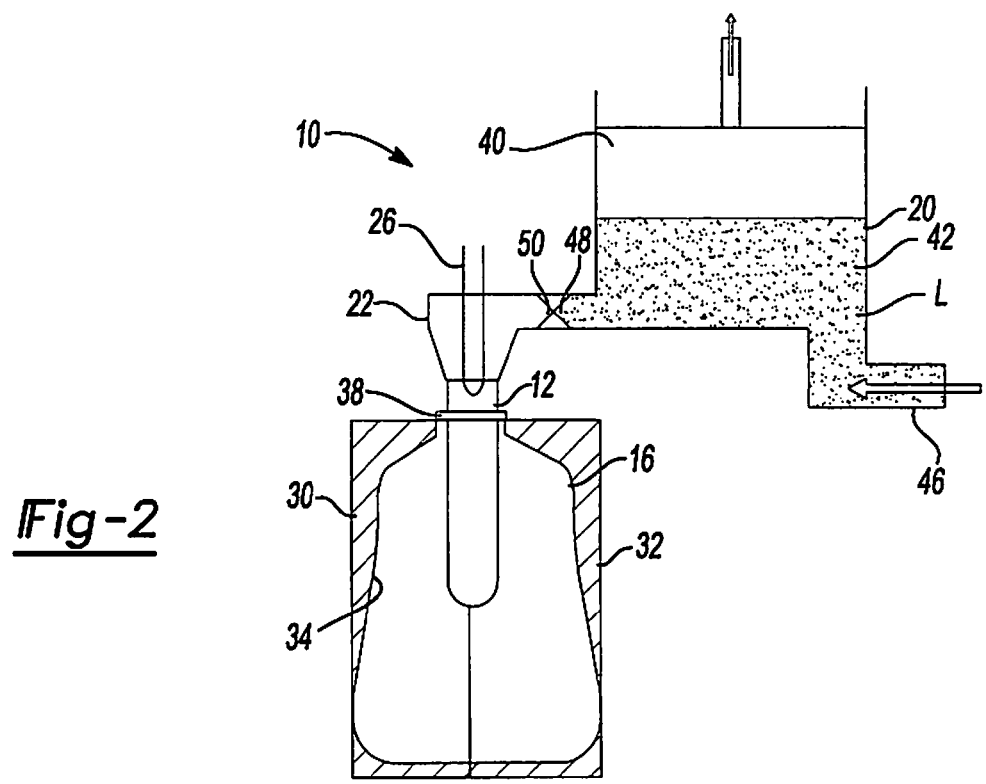
FIG. 2 is a schematic depiction of the system illustrated in FIG. 1 wherein the mold halves close around the preform and liquid continues to accumulate in the pressure source.

With reference now to all Figures, an exemplary method of simultaneously forming and filling the plastic container C will be described. At the outset, the preform 12 may be placed into the mold cavity 16. In one example, a machine (not illustrated) places the preform 12 heated to a temperature between approximately 190° F. to 250° F. (approximately 88° C. to 121° C.) into the mold cavity 16. As the preform 12 is located into the mold cavity 16, the piston-like device 40 of the pressure source 20 may begin to draw liquid commodity L into the filling cylinder, manifold or chamber 42 through the inlet 46. The mold halves 30, 32 of the mold cavity 16 may then close thereby capturing the preform 12 (FIG. 2). The blow nozzle 22 may form a seal at a finish of the preform 12. The mold cavity 16 may be heated to a temperature between approximately 250° F. to 350° F. (approximately 93° C. to 177° C.) in order to impart increased crystallinity levels within the resultant container C. In another example, the mold cavity 16 may be provided at ambient or cold temperatures between approximately 32° F. to 90° F. (approximately 0° C. to 32° C.). Liquid commodity L may continue to be drawn into the filling cylinder, manifold or chamber 42 by the piston-like device 40.

Figure 3:
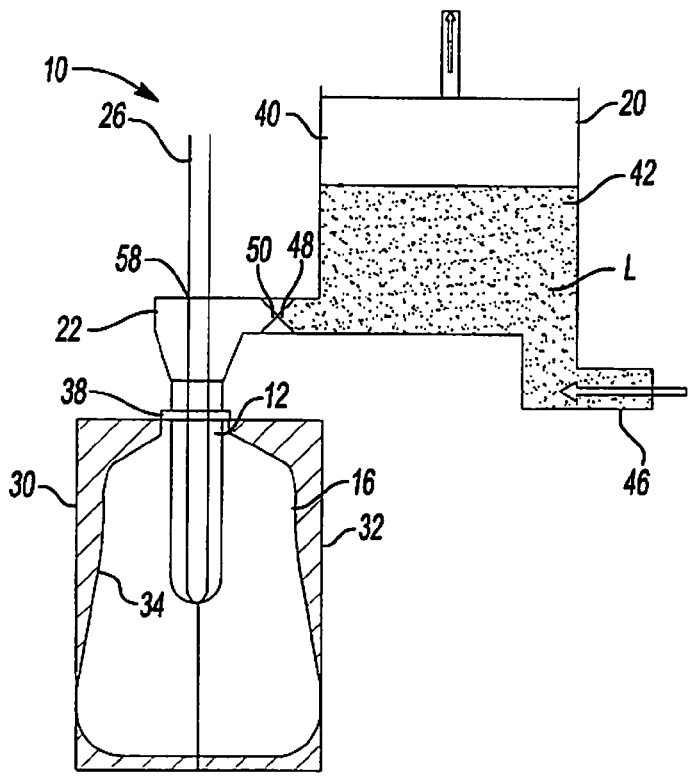
FIG. 3 is a schematic depiction of the system illustrated in FIG. 2 wherein a stretch rod extends into the preform to initiate mechanical stretching and wherein fluid continues to accumulate in the pressure source.
Figure 4:
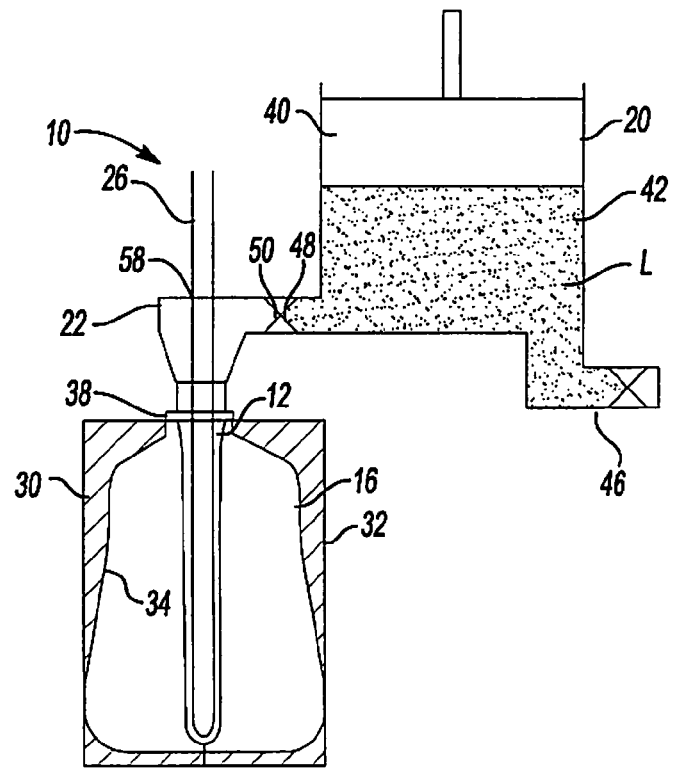
FIG. 4 is a schematic depiction of the system of FIG. 3 wherein the stretch rod stretches the preform and wherein fluid has been fully accumulated in the pressure source.

Turning now to FIG. 3, the stretch rod 26 may extend into the preform 12 to initiate mechanical stretching. At this point, the liquid commodity L may continue to be drawn into the filling cylinder, manifold or chamber 42. With reference to FIG. 4, the stretch rod 26 continues to stretch the preform 12 thereby thinning the sidewalls of the preform 12. The volume of liquid commodity L in the filling cylinder, manifold or chamber 42 may increase until the appropriate volume suitable to form and fill the resultant container C is reached. At this point, a valve disposed at the inlet 46 of the pressure source 20 may be closed.

Figure 5:
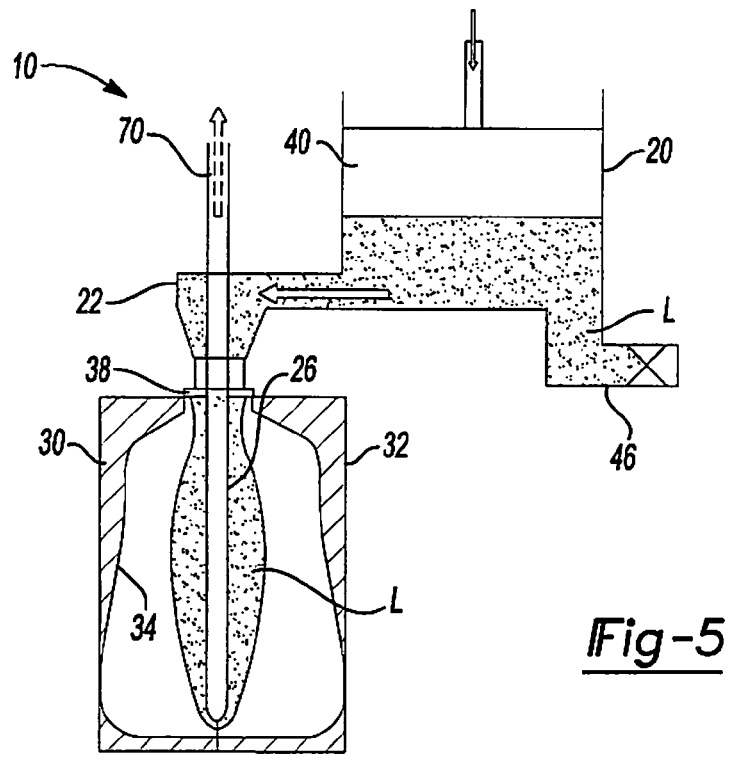
FIG. 5 is a schematic depiction of the system of FIG. 4 wherein the piston-like device drives the liquid from the pressure source to the preform thereby expanding the preform toward the walls of the mold cavity.

With specific reference to FIG. 5, the piston-like device 40 may begin to drive downward (drive phase) to initiate the rapid transfer of liquid commodity L from the filling cylinder, manifold or chamber 42 to the preform 12. Again, the piston-like device 40 may be actuated by any suitable means such as pneumatic, mechanical and/or hydraulic pressure. In one example, the hydraulic pressure within the preform 12 may reach between approximately 100 PSI to 600 PSI. The liquid commodity L causes the preform 12 to expand toward the interior surface 34 of the mold cavity 16. Residual air may be vented through a passage 70 defined in the stretch rod 26 (FIG. 5). As shown in FIG. 6, the piston-like device 40 has completed its drive phase thereby completely transferring the appropriate volume of liquid commodity L to the newly formed plastic container C. Next, the stretch rod 26 may be withdrawn from the mold cavity 16 while continuing to vent residual air. The stretch rod 26 may be designed to displace a predetermined volume of liquid commodity L when it is withdrawn from the mold cavity 16 thereby allowing for the desired fill level of liquid commodity L within the resultant plastic container C and/or the desired headspace. Generally, the desired fill level and/or headspace will correspond at or near the level of the support ring 38 of the plastic container C.

Alternatively, liquid commodity L can be provided at a constant pressure or at different pressures during the molding cycle. For example, during axial stretching of the preform 12, liquid commodity L may be provided at a pressure which is less than the pressure applied when the preform 12 is blown into substantial conformity with the interior surface 34 of the mold cavity 16 defining the final configuration of the plastic container C. This lower pressure $P_1$ may be ambient or greater than ambient but less than the subsequent high pressure $P_2$. The preform 12 is axially stretched in the mold cavity 16 to a length approximating the final length of the resultant plastic container C. During or just after stretching the preform 12, the preform 12 is generally expanded radially outward under the low pressure $P_1$. This low pressure $P_1$ is preferably in the range of between approximately 100 PSI to 150 PSI and can be held for a predetermined amount of time, such as 0.1 to 0.2 seconds. Subsequently, the preform 12 is further expanded under the high pressure $P_2$ such that the preform 12 contacts the interior surface 34 of the mold halves 30, 32 thereby forming the resultant plastic container C. Preferably, the high pressure $P_2$ is in the range of approximately 500 PSI to 600 PSI and can be held for a predetermined amount of time, such as 0.1 to 0.2 seconds. As a result of the above method, the base and contact ring of the resultant plastic container C is fully circumferentially formed.

Optionally, more than one piston-like device may be employed during the formation of the resultant plastic container C. For example, a primary piston-like device may be used to generate the low pressure $P_1$ to initially expand the preform 12 while a secondary piston-like device may be used to generate the subsequent high pressure $P_2$ to further expand the preform 12 such that the preform 12 contacts the interior surface 34 of the mold halves 30, 32 thereby forming the resultant plastic container C.

With reference to FIG. 7, the fill cycle is shown completed. The mold halves 30, 32 may separate and the blow nozzle 22 may be withdrawn. The resultant filled plastic container C is now ready for post-forming steps such as capping, labeling and packing. At this point, the piston-like device 40 may begin the next cycle by drawing liquid commodity L through the inlet 46 of the pressure source 20 in preparation for the next fill/form cycle. While not specifically shown, it is appreciated that the mold station 10 may include a controller for communicating signals to the various components. In this way, components such as, but not limited to, the mold cavity 16, the blow nozzle 22, the stretch rod 26, the piston-like device 40 and various valves may operate according to a signal communicated by the controller. It is also contemplated that the controller may be utilized to adjust various parameters associated with these components according to a given application.

It should be appreciated that in some embodiments, a movable filling cylinder, manifold, or chamber may not provide sufficient space optimization or facility efficiency. Moreover, in some embodiments, it may be difficult to obtain and/or route pressurized air or liquid from a first location to the preform shaping location.

Therefore, in other examples, the pressure source 20 can be in the form of a servo system 60 that generally includes one or more servo motors 62 being actuated by one or more controllers 64 via a line 66. The servo system 60 can be positioned adjacent to the preform shaping location. The servo system 60 can comprise inlet 46 for accepting liquid commodity L and outlet 48 for delivering the liquid commodity L to the blow nozzle 22. The servo motor 62 may be operable in a first direction to draw liquid commodity L from the inlet 46 and output the liquid commodity L from the outlet 48 to the blow nozzle 22 (i.e. forward flow). The servo motor 62, in some embodiments, may also be operable in a second direction to draw liquid commodity L from outlet 48, blow nozzle 22, and/or preform 12 (i.e. reverse flow), which will be discussed in greater detail herein.

In some embodiments, servo motor 62 can be used to overcome some of the difficulties in metering precise and/or minute quantities of commodity L. That is, servo motor 62 is precisely and variably controlled to permit precise metering of a through flow of commodity L and at a variable rate. This precise and variably control can be coupled with a feedback loop to provide active and real-time monitoring and control of the fill process, including stopping of the filling process in the event of a detected issue, such as a blow-out. In this way, the feedback loop can be formed as part of controller 64, with appropriate sensors disposed at any one of a number of locations provide sufficient data to detected a relevant parameter (e.g. pressure sensors, flow sensors, shape sensors, and the like). Because active control of the pressures and quantity of flow of commodity L is often important to the final formed product, the use of servo system 60 is particularly well suited to provide such benefits.

It should be recognized that servo system 60 may require less electrical power to operate, thereby providing additional benefits in terms of reduced electrical consumption and cost.

As discussed herein, in some embodiments, it is desirable to create a reduced fill level of commodity L in the completed container (i.e. headspace). This headspace is used to prevent spilling during handling and to allow the container to be formed slightly bigger than its fill. In some embodiments, to create a headspace, the servo system 60 can be actuate in the described reverse flow direction to remove a metered amount of commodity L from the container after shaping so that a larger container can be formed with a smaller amount of liquid left therein.

It should also be recognized that in some embodiments, after pressure source 20 is turned off, a gap of commodity L or volume of commodity L is located between pressure source 20 and the entrance of the container. It is desirable, in some cases, to manage and/or retain this gap of commodity L to prevent undesirable overfilling of the container or spillage. Again, the use of servo system 60 in a reverse flow direction can be used to remove this gap of commodity L to prevent or at least minimize such problems.

Still further, the use of servo system 60 in a reverse flow direction can be used to define a vacuum within the container. The vacuum force within the container can cause the walls of the container to collapse inwardly, thereby disengaging the container from the interior surface 34 of the mold cavity 16, and finally permitting faster depressurization of the fill lines to reduce the amount of commodity L flow back to the tank via any valve system.

Due to the rapid cycle time necessary for use with servo system 60, a single servo filling unit could be used to shape and fill multiple preforms 12 simultaneously or nearly simultaneously without sacrificing control over the filling pressure curves and volumes. Accordingly, such can be used to reduce the amount of controls, number of servo systems necessary, thereby reducing costs and the plant space necessary for manufacture. Moreover, maintenance reductions can be realized.

Specifically, in some embodiments, different methods can be used for shaping and filling preforms with fewer servo systems. As described herein, the actual fill time of a container, for example, can be generally in the range of about 0.3 to 0.6 seconds. This pressure is maintained in the container for improved definition of the container.

In some embodiments, a staggered arrangement of servo systems 60 can be used to shape and fill a first plurality of preforms 12 simultaneously that is followed by the shaping and filling of a second plurality of preforms 12. Currently, six mold cavity systems are available for conventional blow molding having about a 2.6 second station cycle for the six mold cavities. With an estimated fill time of about 0.2 to 0.3 seconds and an estimated recovery time (to refill the filling cylinder) of about 0.4 seconds, the total time required to fill and refill would be about 0.6 to 0.7 seconds. Therefore, for a 2.6 second station cycle time, one third of the six mold system (i.e. 2 mold cavities) could be filled simultaneously using two servo systems 60, and the station advanced to present the next third of the cavities (i.e. 2 mold cavities) for container filling and cylinder refilling. Accordingly, the six mold system could be filled in thirds for improved throughput capacity.

In some embodiments, filling cylinders can be used in tandem such that one cylinder is always available for container filling while the other of the cylinders is refilling. Still further, in some embodiments, the piston 40 of the present teachings can be configured as a double-side piston such that as it is actuated to expel commodity L from one side of the piston 40, the other side is acting on an opposing cylinder and drawing commodity L into an opposing cylinder volume. Therefore, a reciprocating action of the piston 40 can serve as both a filling/refilling and a refilling/filling operation.

Some additional advantages realized by the present teachings will now be discussed further.

The combination of both the blow and filling processes into one piece of equipment (mold station 10) may reduce handling parts and therefore lead to reduced capital cost per resultant plastic container C. In addition, the space required by a process that simultaneously blows and fills the resultant plastic container C may be significantly reduced over the space required when the processes are separate. This may also result in lower infrastructure cost.

Integrating the two processes into a single step may reduce labor and additional costs (both capital and expense) associated with handling bottles after they are produced and before they are filled.

Integrating the blowing and filling processes into a single process eliminates the need to ship bottles. The shipping of bottles is inherently inefficient and expensive. Shipping preforms, on the other hand, is much more efficient. In one example, a trailer load of empty 500 ml water bottles contains approximately 100,000 individual bottles. The same size trailer loaded with preforms required to make 500 ml water bottles will carry approximately 1,000,000 individual preforms, a 10:1 improvement.

Compressed air is a notoriously inefficient means of transferring energy. Using the final product to provide hydraulic pressure to blow the container will require the equivalent of a positive displacement pump. As a result, it is a much more efficient way to transfer energy. Use of a servo system as described herein is an even more efficient way to transfer energy.

In the exemplary method described herein, the preforms may be passed through an oven in excess of 212° F. (100° C.) and immediately filled and capped. In this way, the opportunity for an empty container to be exposed to the environment where it might become contaminated is greatly reduced. As a result, the cost and complexity of aseptic filling may be greatly reduced.

In some instances where products are hot filled, the package must be designed to accommodate the elevated temperature that it is exposed to during filling and the resultant internal vacuum it is exposed to as a result of the product cooling. A design that accommodates such conditions may require added container weight. Liquid/hydraulic blow molding offers the potential of eliminating the hot fill process and as a result, lowering the package weight.

The process described herein may eliminate intermediary work in process and therefore may avoid the cost associated with warehousing and/or container silos and/or forklifts and/or product damage, etc. In addition, without work in process inventory, the overall working capital may be reduced.

As blowing and filling are integrated closer but remain as two separate processes (such as conventional methods of forming and subsequently filling), the overall efficiency of such a system is the product of the individual efficiencies of the two parts. The individual efficiencies may be driven largely by the number of transitions as parts move through the machines. Integrating the two processes into one may provide the opportunity to minimize the number of transitions and therefore increase the overall process efficiency.

Many beverages, including juices, teas, beer, etc., are sensitive to oxygen and need to be protected when packaged. Many plastics do not have sufficient barrier characteristics to protect the contents from oxygen during the life of the packaged product. There are a number of techniques used to impart additional barrier properties to the container to slow down oxygen transmission and therefore protect the package contents. One of the most common techniques is to use an oxygen scavenger in the bottle wall. Such a scavenger may be molded directly into the preform. The relatively thick wall of the preform protects the scavenger from being consumed prior to blowing it into a container. However, once the container has been blown, the surface area of the wall increases and the thickness decreases. As such, the path that the oxygen has to travel to contact and react with the active scavenging material is much shorter. Significant consumption of oxygen scavengers may begin as soon as the container is blown. If the container is formed and filled at the same time, then the scavenger is protecting the product through its entire useful life and not being consumed while the container sits empty waiting to be filled.

The method described herein may be particularly useful for filling applications such as isotonic, juice, tea and other commodities that are susceptible to biological contamination. As such, these commodities are typically filled in a controlled, sterile environment. Commercially, two ways are typically used to achieve the required sterile environment. In Europe, one primary method for filling these types of beverages is in an aseptic filling environment. The filling operation is performed in a clean room. All of the components of the product including the packaging must be sterilized prior to filling. Once filled, the product may be sealed until it is consumed preventing any potential for the introduction of bacteria. The process is expensive to install and operate. As well, there is always the risk of a bacterial contaminant breaking through the operational defenses and contaminating the product.

In North America, one predominant method for filling contaminant susceptible beverages is through hot filling. In this process, the beverage is introduced to the container at a temperature that will kill any bacteria that is present. The container may be sealed while the product is hot. One drawback to this technology is that the containers usually need to be heavy to sustain the elevated filling temperature and the vacuum that eventually develops in the container as the product cools. As well, the blow process is somewhat more complex and therefore more costly than non-heat set blow molding. The disclosure described herein offers the opportunity to dramatically reduce the cost and complexity of filling sensitive foods and beverages. By combining the blowing and filling processes, there is an ability to heat the preform to over 212° F. (100° C.) for a sufficient period of time necessary to kill any biological contaminants. If a sterile product is used as the container forming medium and then immediately sealed, the process may result in a very inexpensive aseptic filling process with very little opportunity for contamination.

There are many other bottled products where this technology may be applicable. Products such as dairy products, liquor, household cleaners, salad dressings, sauces, spreads, syrups, edible oils, personal care items, and others may be bottled utilizing such methods. Many of these products are currently in blow molded PET containers but are also in extrusion molded plastic containers, glass bottles and/or cans. This technology has the potential of dramatically changing the economics of package manufacture and filling.

While much of the description has focused on the production of PET containers, it is contemplated that other polyolefin materials (e.g., polyethylene, polypropylene, etc.) as well as a number of other plastics may be processed using the teachings discussed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for simultaneously forming and filling a container comprising:
a mold cavity defining an internal surface and adapted to accept a preform;
a pressure source having a servo motor system operable in a first upward direction wherein liquid is drawn from an inlet and a second downward direction wherein liquid is urged toward the preform; and
a blow nozzle adapted to receive the liquid from the pressure source and transfer the liquid at a pressure into the preform thereby urging the preform to expand toward the internal surface of the mold cavity and create a resultant container, wherein the liquid remains within the container as an end product.

2. The system for simultaneously forming and filling a container according to claim 1 wherein the servo motor system comprises at least one servo motor and a controller, wherein the at least one servo motor is variably controlled.

3. The system for simultaneously forming and filling a container according to claim 1 wherein the blow nozzle defines a shape adapted to form a seal with a finish of the preform.

4. The system for simultaneously forming and filling a container according to claim 1 wherein the liquid is transferred into the preform during a hot-fill process.

5. The system for simultaneously forming and filling a container according to claim 4 wherein the liquid is transferred into the preform at a temperature between approximately 185° F. (85° C.) and 205° F. (96° C.).

6. The system for simultaneously forming and filling a container according to claim 1 wherein the liquid is transferred into the preform at an ambient temperature.

7. The system for simultaneously forming and filling a container according to claim 6 wherein the liquid is transferred into the preform at a temperature between approximately 32° F. (0° C.) and 90° F. (32° C.).

8. The system for simultaneously forming and filling a container according to claim 1 wherein the mold cavity accepts a preform heated to a temperature between approximately 190° F. (88° C.) and 250° F. (121° C.).

9. The system for simultaneously forming and filling a container according to claim 1 wherein the mold cavity is heated to a temperature between approximately 250° F. (93° C.) and 350° F. (177° C.).

10. The system for simultaneously forming and filling a container according to claim 1 wherein the mold cavity is at a temperature between approximately 32° F. (0° C.) to 90° F. (32° C.).

11. The system for simultaneously forming and filling a container according to claim 1 wherein the liquid is transferred into the preform at a pressure between approximately 100 PSI and 600 PSI.

12. The system for simultaneously forming and filling a container according to claim 1, further comprising a stretch rod adapted to extend into the preform and mechanically stretch the preform prior to the liquid being urged into the preform.

13. The system for simultaneously forming and filling a container according to claim 12 wherein the stretch rod is vented to atmosphere.

14. The system for simultaneously forming and filling a container according to claim 1 wherein the preform is initially expanded outwardly under a first pressure and subsequently expanded outwardly under a second pressure, the second pressure being greater than the first pressure.

15. The system for simultaneously forming and filling a container according to claim 14 wherein the first pressure is between approximately 100 PSI and 150 PSI, and the second pressure is between approximately 500 PSI and 600 PSI.

16. The system for simultaneously forming and filling a container according to claim 15 wherein the servo motor system generates the first pressure and the second pressure.

17. The system for simultaneously forming and filling a container according to claim 1 wherein the servo motor system is operable in a second direction, opposite of the first direction, wherein liquid is drawn out of the preform to define a headspace therein.

18. The system for simultaneously forming and filling a container according to claim 1 wherein the servo motor system is operable in a second direction, opposite of the first direction, wherein a vacuum is created within the preform to disengage the preform from the internal surface of the mold cavity.

19. The system for simultaneously forming and filling a container according to claim 1, further comprising:
a controller operably coupled to the servo motor system monitoring an operational status of the servo motor system.

20. The system for simultaneously forming and filling a container according to claim 1, further comprising:
a controller operably coupled to the servo motor system detecting a blowout of the preform.

21. A system for simultaneously forming and filling a container comprising:
a plurality of mold cavities each defining an internal surface and adapted to accept a preform;
a pressure source having a single servo motor system operably coupled with the plurality of mold cavities to supply a liquid to at least one of the plurality of mold cavities, the single servo motor system operable in a first upward direction wherein liquid is drawn from an inlet and a second downward direction wherein liquid is urged toward the preform associated with the at least one of the plurality of mold cavities; and
a blow nozzle adapted to receive the liquid from the pressure source and transfer the liquid at a pressure into the preform thereby urging the preform to expand toward the internal surface of the mold cavity and create a resultant container, wherein the liquid remains within the container as an end product.

22. The system for simultaneously forming and filling a container according to claim 21 wherein said single servo motor system is operably coupled with the plurality of mold cavities to supply said liquid to at least two of the plurality of mold cavities, the single servo motor system operable in a first direction wherein liquid is drawn from said inlet and simultaneously urged toward the preform associated with the at least two of the plurality of mold cavities.

23. A system for simultaneously forming and filling a container comprising:
a mold cavity defining an internal surface and adapted to accept a preform;
a pressure source having a servo motor system operable in a first direction wherein liquid is drawn from an inlet and urged toward the preform;
a controller operably coupled to the servo motor system detecting a blowout of the preform; and
a blow nozzle adapted to receive the liquid from the pressure source and transfer the liquid at a pressure into the preform thereby urging the preform to expand toward the internal surface of the mold cavity and create a resultant container, wherein the liquid remains within the container as an end product.

* * * * *